(12) United States Patent
Chohan et al.

(10) Patent No.: US 6,965,612 B2
(45) Date of Patent: Nov. 15, 2005

(54) METHODS AND APPARATUS FOR THE HARDWARE IMPLEMENTATION OF VIRTUAL CONCATENATION AND LINK CAPACITY ADJUSTMENT OVER SONET/SDH FRAMES

(75) Inventors: Harpreet S. Chohan, Stamford, CT (US); Christophe Rouaud, Toulouse (FR)

(73) Assignee: Transwitch Corporation, Shelton, CT (US)

( * ) Notice: Subject to any disclaimer, the term of this patent is extended or adjusted under 35 U.S.C. 154(b) by 114 days.

(21) Appl. No.: 10/323,442

(22) Filed: Dec. 18, 2002

(65) Prior Publication Data

US 2004/0120362 A1 Jun. 24, 2004

(51) Int. Cl.[7] .............................. H04J 3/16; H04L 12/28
(52) U.S. Cl. ........................................ 370/465; 370/907
(58) Field of Search ................................ 370/465, 907, 370/468, 532–546

(56) References Cited

U.S. PATENT DOCUMENTS

| | | | | |
|---|---|---|---|---|
| 5,461,622 A | * | 10/1995 | Bleickardt et al. | 370/907 |
| 5,615,237 A | * | 3/1997 | Chang et al. | 370/513 |
| 5,777,998 A | * | 7/1998 | Traverso et al. | 370/506 |
| 6,381,328 B1 | * | 4/2002 | Morton et al. | 379/221.08 |
| 6,449,292 B1 | * | 9/2002 | Weeber | 370/514 |
| 6,636,529 B1 | * | 10/2003 | Goodman et al. | 370/469 |
| 6,667,989 B1 | * | 12/2003 | Sekii et al. | 370/907 |
| 6,697,373 B1 | * | 2/2004 | Sandstrom | 370/907 |
| 6,700,900 B1 | * | 3/2004 | Turban | 370/465 |

OTHER PUBLICATIONS

Paul Bonenfant et al, Generic Framing Procedure (GFP): The Catalyst for Efficient Data over Transport, May 2002, IEEE Communications Magazine, pp. 72–79.*
Richard Schildberg, Virtual concatenation, LCAS benefit next–gen Sonet/ SDH nets, Jun. 10, 2002, CommsDesign.*
*Synchronous Digital Hierarchy Bit Rates*, CCITT Recommendation G.707, International Telecommunication Union, Geneva, 1991.
*Synchronous Frame Structures Used at 1544, 6312, 2048, 8448 and 44 736 kbit/s Hierarchical Levels*, ITU–T Recommendation G.704, International Telecommunication Union, Oct. 1998.

* cited by examiner

*Primary Examiner*—Andy Lee
(74) *Attorney, Agent, or Firm*—Gordon & Jacobson, PC

(57) ABSTRACT

Methods and apparatus for the hardware implementation of virtual concatenation and link capacity adjustment over SONET/SDH frames include providing a state machine on chip with a SONET/SDH mapper and providing means whereby a plurality of members of a VCG can share the same state machine. The apparatus of the invention preferably includes a time wheel for granting access to the single state machine and memory for storing state information for each of the VCG members. According to the presently preferred embodiment, the invention is implemented on chip with an OC-3 Ethernet mapper. Up to eighty-four VCG members share the same state machine and memory is provided on the chip for maintaining the state information for eighty-four VCG members. Fifteen bits are used to store the state information for each VCG member in low order and seventeen bits are used to store the state information for each VCG member in high order. The presently preferred time wheel runs at 20 MHz.

30 Claims, 8 Drawing Sheets

METHODS AND APPARATUS FOR THE HARDWARE IMPLEMENTATION OF VIRTUAL CONCATENATION AND LINK CAPACITY ADJUSTMENT OVER SONET/SDH FRAMES

BACKGROUND OF THE INVENTION

1. Field of the Invention

The invention relates to telecommunications, the Synchronous Optical Network (SONET) and the Synchronous Digital Hierarchy (SDH). More particularly, the invention relates to methods for performing virtual concatenation and link capacity adjustment in hardware.

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/VC occupies the remaining 87 columns.

In Europe, the base (STM-1) rate is 155.520 Mbit/sec, equivalent to the North American STS-3 rate (3*51.84= 155.520). The STS-3 (STM-1) signals can accommodate 3 DS-3 signals or 63 E1 signals or 84 DS-1 signals, or a combination of them. The STS-12 signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. (The ITU calls these Tributary Units or TUs.) This mapping divides the SPE (VC) frame into seven equal-sized sub-frames or VT (TU) groups with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s) and accommodates a DS1C (T2) signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM signals. In the early 1980s these TDM signals were essentially multiplexed telephone lines, each having the (now considered) relatively small bandwidth of 56–64 kbps. At that time, there was no real standard for data communication. There were many different schemes for local area networking and the wide area network which eventually became known as the Internet was based on a "56 k backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary but too small for an entire STS-1. In other words, under the existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals (as well as other signals such as Fiber Channel and ESCON) into a SONET/SDH frame, the Virtual Concatenation Protocol was created and has been endorsed by the ITU as the G.707 standard. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes (four of the sixteen "H4" bytes) to indicate two numbers: the multiframe indicator (MFI) and the sequence number (SQ).

Part of the emerging Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions, for example. It would be desirable to alter the user's available bandwidth as needed. LCAS provides a means to do this without disturbing other traffic on the link. LCAS has been endorsed by the ITU as the G.7042 standard which is hereby incorporated by reference herein in its entirety.

While Virtual Concatenation is a simple labelling protocol, LCAS requires a two-way handshake (using seven of the sixteen H4 bytes for high order and seventeen of the thirty-two K4 bits for low order). Status messages are continually exchanged and actions are taken based on the content of the messages. For example, to provide high order (STS-1) virtual concatenation, each STS-1 signal carries one of six LCAS control commands which are described as follows:

"Fixed"—LCAS not supported on this STS-1;
"Add"—Request to add this STS-1 to a VCG, thereby increasing the bandwidth of an existing VCG or creating a new VCG;
"Norm"—This STS-1 is in use;
"EOS"—This STS-1 is in use and is the last STS-1 of this VCG, i.e. the STS-1 with the highest SQ number;
"Idle"—This STS-1 is not part of a VCG or is about to be removed from a VCG;
"Do not use"—This STS-1 is supposed to be part of a VCG, but does not transport payload due to a broken link reported by the destination.

The LCAS protocol as defined in ITU-T G.7042 requires that a finite state machine be provided for each member of a VCG to maintain the control command (state) for each member. This can be a substantial chore. For example, to provide low order (VT1.5) virtual concatenation within an STS-3 signal, eighty-four state machines must be provided, one for each VT1.5.

State of the art SONET/SDH mapping is performed on the chip level with some external support from a microprocessor. The mapper chip may contain all of the apparatus needed for mapping but not for provisioning. Provisioning is provided by an attached microprocessor, e.g. a UNIX workstation. A SONET/SDH switch may include many mapper chips and be coupled to a single workstation which controls provisioning. Historically, SONET/SDH provisioning was performed infrequently and manually by a person operating the workstation attached to the switch. With the advent of LCAS, however, provisioning must be performed more frequently and automatically. Since one workstation is responsible for controlling many mapper chips in a switch, it is necessary to implement many state machines (one for each member of a VCG) in the workstation. This can become quite a burden on the workstation to maintain hundreds, perhaps thousands of state machines.

It would be desirable to relieve the workstation from the task of maintaining so many state machines, but implementing the state machines in hardware is costly and would require additional chips.

SUMMARY OF THE INVENTION

It is therefore an object of the invention to provide methods and apparatus for the hardware implementation of virtual concatenation and link capacity adjustment.

It is also an object of the invention to provide methods and apparatus for the hardware implementation of virtual concatenation and link capacity adjustment which are relatively inexpensive.

It is another object of the invention to provide methods and apparatus for the hardware implementation of virtual concatenation and link capacity adjustment which do not require additional chips.

In accord with these objects which will be discussed in detail below, the methods and apparatus of the present invention include providing a state machine on chip with a SONET/SDH mapper and providing means whereby a plurality of members of a VCG can share the same state machine. More particularly, the apparatus of the invention preferably includes a time wheel for granting access to the single state machine and memory for storing state information for each of the VCG members. According to the presently preferred embodiment, the invention is implemented on chip with an OC-3 Ethernet mapper. Thus, up to eighty-four VCG members share the same state machine and memory is provided on the chip for maintaining the state information for eighty-four VCG members. According to the presently preferred embodiment, fifteen bits are used to store the state information for each VCG member in low order and seventeen bits are used to store the state information for each VCG member in high order. The presently preferred time wheel runs at 20 MHz.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
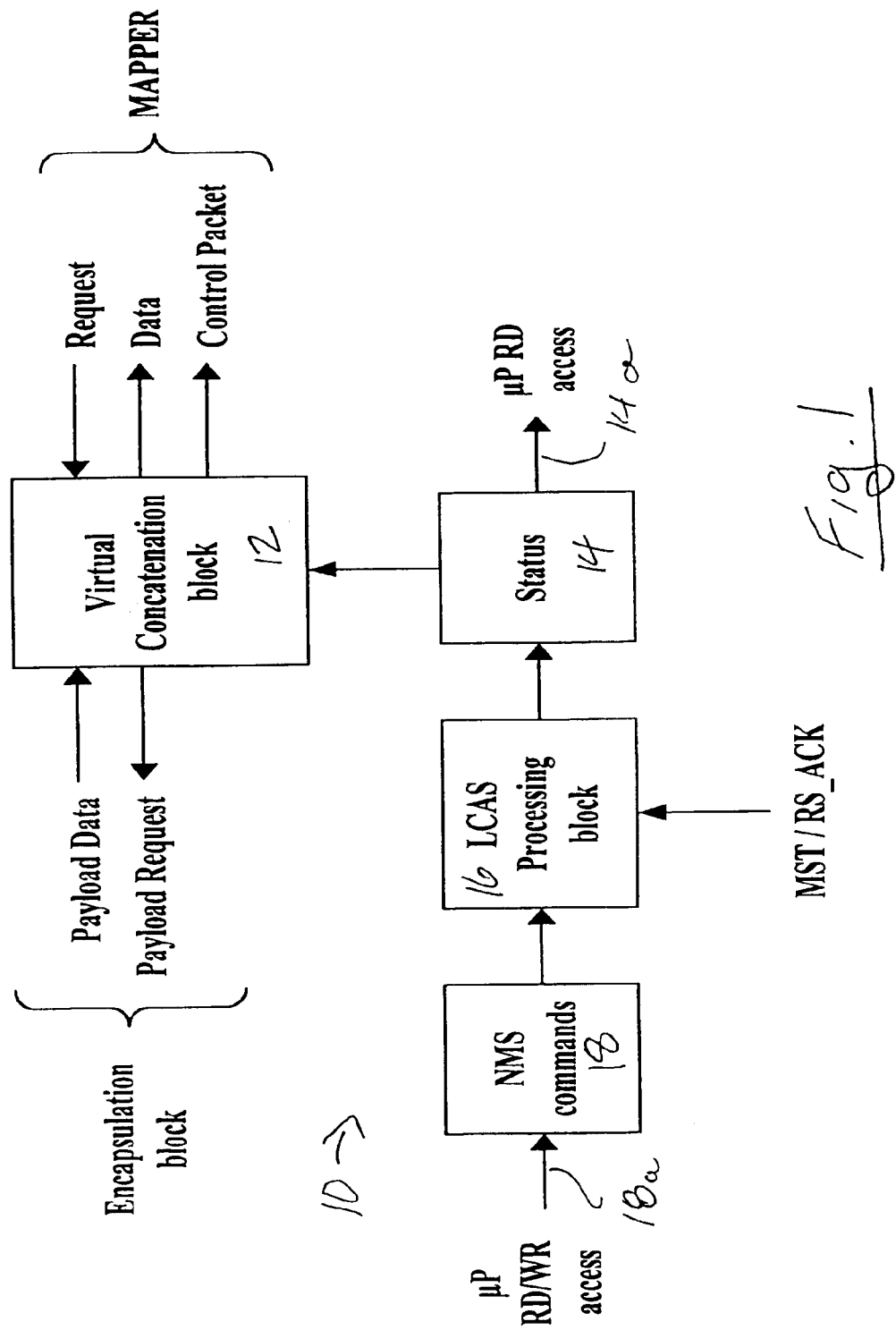
FIG. 1 is a schematic block diagram of an architectural overview of the invention illustrating the relationship between the virtual concatenation block, the LCAS processing block, the member status registers, the mapper, and the network management microprocessor.

Referring now to FIG. 1, an apparatus 10 incorporating the invention includes a virtual concatenation block 12 which is coupled to status registers 14. The member status registers receive input from the LCAS processing block 16 which receives network management system (NMS) commands from the NMS commands buffer 18 as well as member status messages (MST) and resequence acknowledge messages (RS_ACK) which are extracted at the sink in received control packets. The virtual concatenation block 12 receives payload data from an encapsulation block (not shown) and provides payload data and control packets to the mapper (not shown) based on the contents of the status registers 14. The virtual concatenation block 12 also receives payload requests from the mapper and passes those requests to the encapsulation block.

The microprocessor access 18a to the NMS commands buffer 18 and 14a to the status registers 14 allows the network management system (e.g. an attached workstation) to provision VCGs by assigning the members of each VCG via (add/remove) commands to the LCAS processing block 16 via the buffer 18. The virtual concatenation block 12 is slave to the MAPPER which makes requests for bytes of payload and control packets. The bytes sent to the MAPPER are extracted from the encapsulation block which provides encapsulated Ethernet frames (or similar frames as mentioned above).

Figure 2:
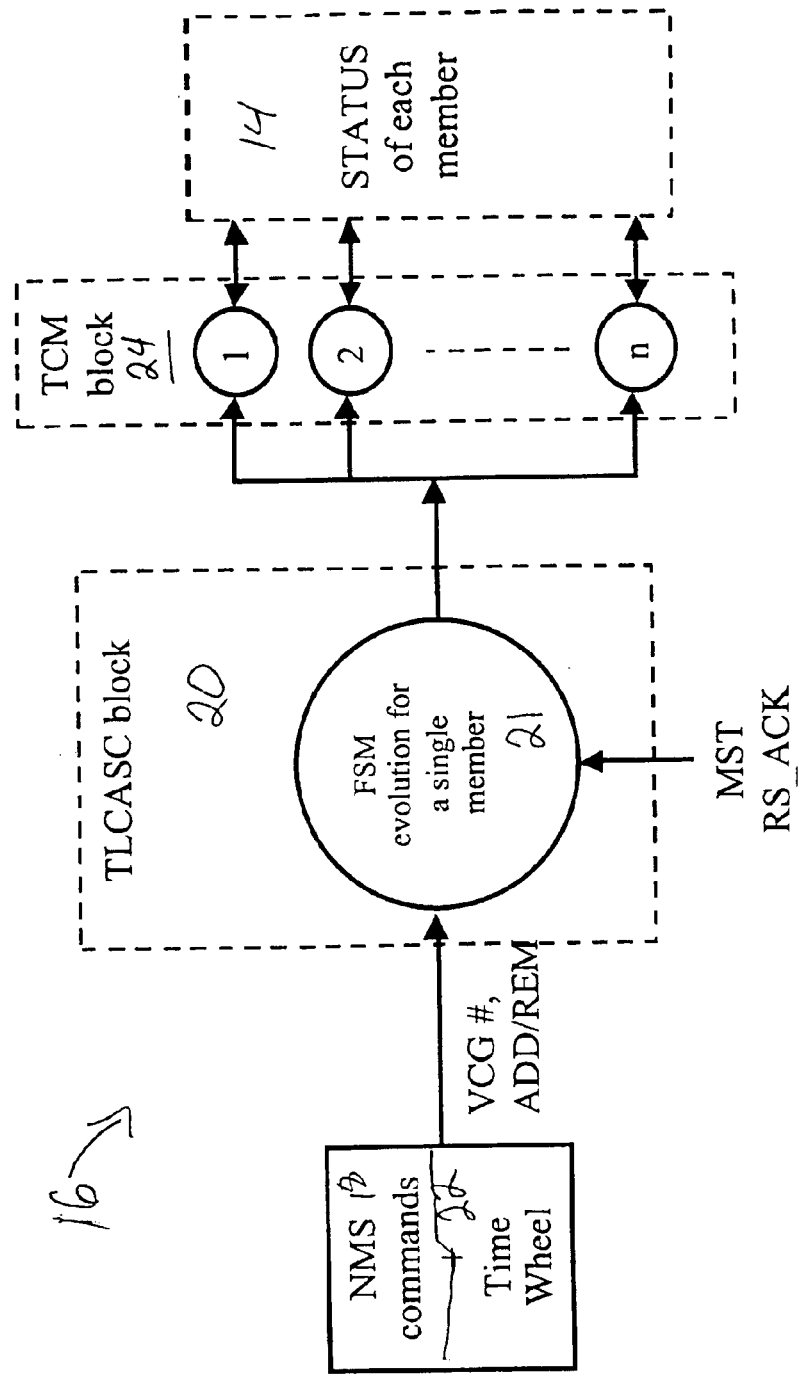
FIG. 2 is a high level schematic diagram of the LCAS processing block according to the invention.

Turning now to FIG. 2, according to the present invention the LCAS processing block 16 is composed of two parts: the TLCASC (transmit LCAS controller) block 20 which includes a single finite state machine 21 which is shared by all members of all VCGs, and a TCM (transmit configuration management) block 24 which interrelates the state change of one member with all of the other members as described in more detail with reference to FIGS. 5 and 6. As shown in FIG. 2, the single finite state machine 21 receives inputs from the NMS commands buffer 18, a time wheel 22, the aforementioned MST and RS_ACK signals, and the last state of each member as described in more detail with reference to FIG. 4. The time wheel 22 selects which member has use of the finite state machine 21 and the NMS commands buffer 18 supplies ADD and REMOVE instructions regarding different VCGs as per the provisioning requirements programmed into the attached microprocessor/workstation. In other words, the microprocessor/workstation is programmed to adjust the bandwidth of various VCGs at various times and the commands to do so are buffered in the NMS commands buffer 18.

From the foregoing, it will be appreciated that in the arrangement of the invention, only one member may transition at a time, i.e. when the time wheel has selected it to use the finite state machine. This leads to reduced complexity since no other member needs to be taken into account as the one member transitions. However, the transition of the instant member can affect the other members of the same VCG, e.g. EOS not at last SQ value, possibility of duplicate SQs, etc. In order to properly sequence the members of the VCG after transition members, the TCM block maintains and adjusts the sequencing of members (shown in the TCM block 24 as 1, 2, ... n) as described in more detail with reference to FIGS. 5 and 6.

Since it is impossible for two members to change state in the same clock period, resequencing is simpler with a restricted set of possible outcomes. The SQ and CTRL value of each member in a VCG depends on two criteria: their previous state and the current and previous SQ/CTRL values of the member being treated by the LCAS state machine. When a member of a VCG that is being treated by the TLCASC block is changing state, all of the remaining members of that VCG may also be affected. This change, which can affect both the member being treated by the TLCASC block and the remaining members of the VCG, is processed separately by each member's individual TCM sub block. This arrangement results in a coherent configuration (set of members), which at any time is available for each VCG. In other words, this arrangement results in a reduced and deterministic set of scenarios, which aids to simplfy the verification process.

These advantages of the invention allow on-chip LCAS processing with a large number of members without the timing problems caused by the large number of interconnections between separate member FSMs as encountered in the prior art.

Figure 3:
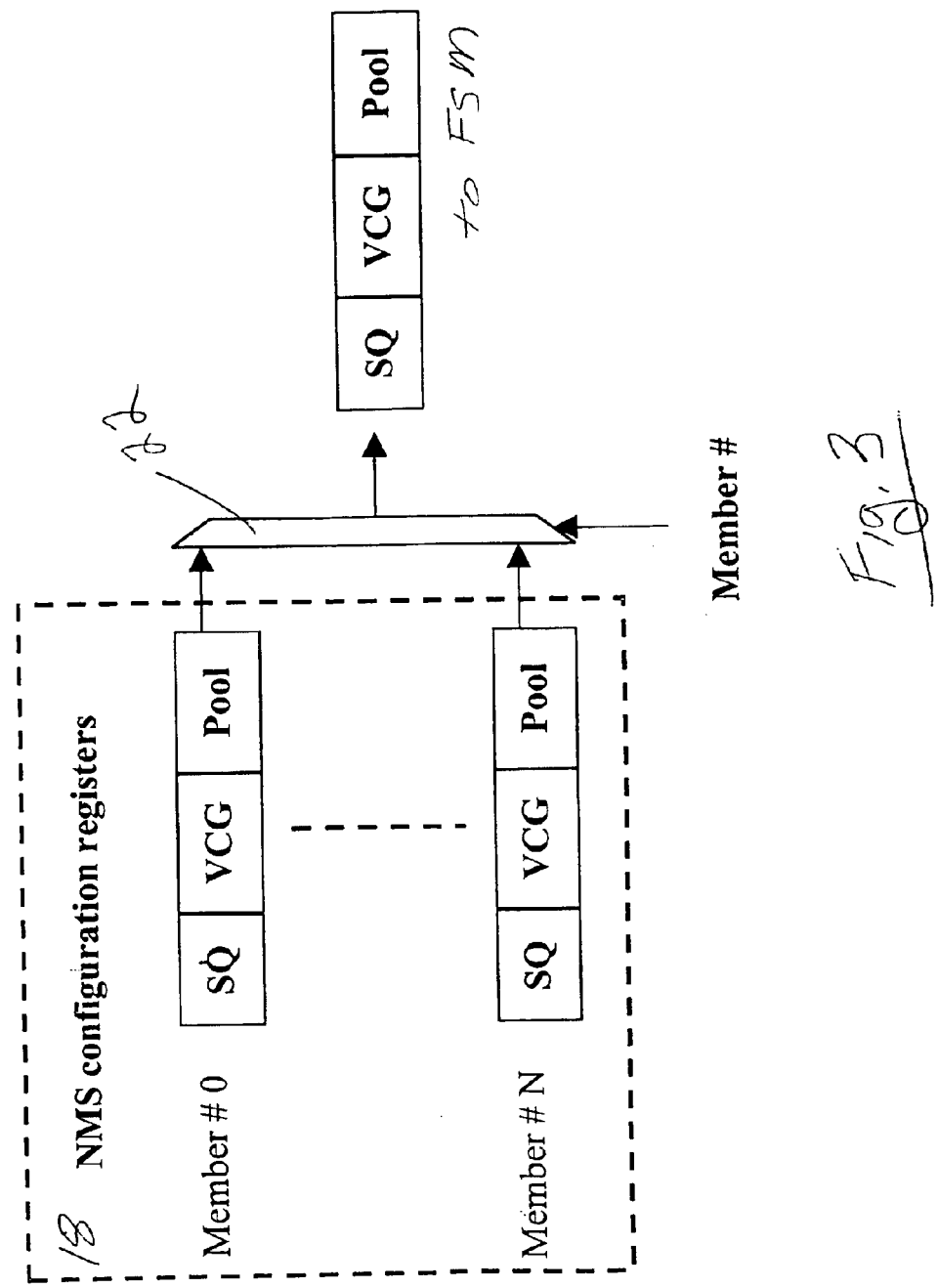
FIG. 3 is a high level block diagram of the timewheel multiplexing of member configuration registers.

Turning now to FIG. 3, according to the preferred embodiment the NMS buffer 18 includes a configuration register for each member of each VCG. For each member, the register includes the SQ number, the VCG to which the member belongs, and the "pool" in which the member is located. According to the invention, there are four different pools:

In the GLOBAL pool, the members are not used by any VCG.

In the Non-LCAS pool, the members are allocated to a Non-LCAS VCG and transport payload according to configured SQ values.

In the LCAS-IDLE pool, the members are allocated to an LCAS VCG but remain in IDLE state and do not carry payload.

In the LCAS-ADD pool, the members are allocated to an LCAS VCG and are requested for payload transport for the VCG.

According to the LCAS standard, members of a low order (LO) VCG may have an SQ value in the range 0 to 63 and members of a high order (HO) VCG may have an SQ value in the range 0–255. Thus, for LO members, the SQ portion of the register is 6-bits and for HO members the SQ portion of the register is 8-bits. For both LO and HO VCG members the VCG portion of the register is 3-bits and the pool portion of the register is 2-bits. These configuration registers are selected one by one by the time wheel for each member in the SONET/SDH frame and the contents of the selected register is forwarded to the TLCASC block (20 in FIG. 2).

The order in which members are selected by the time wheel depends on the configuration of the SONET/SDH frame. The time wheel generates AU3, TUG2, and TU2 indices. In high order (HO) mode, the VT# is the same as the AU3 index. In LO mode, members 0–62 are selected consecutively by the time wheel,computed from AU3, TUG2, and TU2 as shown in Table 1 below.

TABLE 1

| AU3 | 0 | 1 | 2 | 0 | 1 | 2 | 0 | 1 | 2 |
|---|---|---|---|---|---|---|---|---|---|
| TUG2 | 6 | | | 0 | | | 1 | | |
| TU2 | 2 | | | 0 | | | | | |
| VT# | 60 | 61 | 62 | 0 | 1 | 2 | 3 | 4 | 5 |

Figure 4:
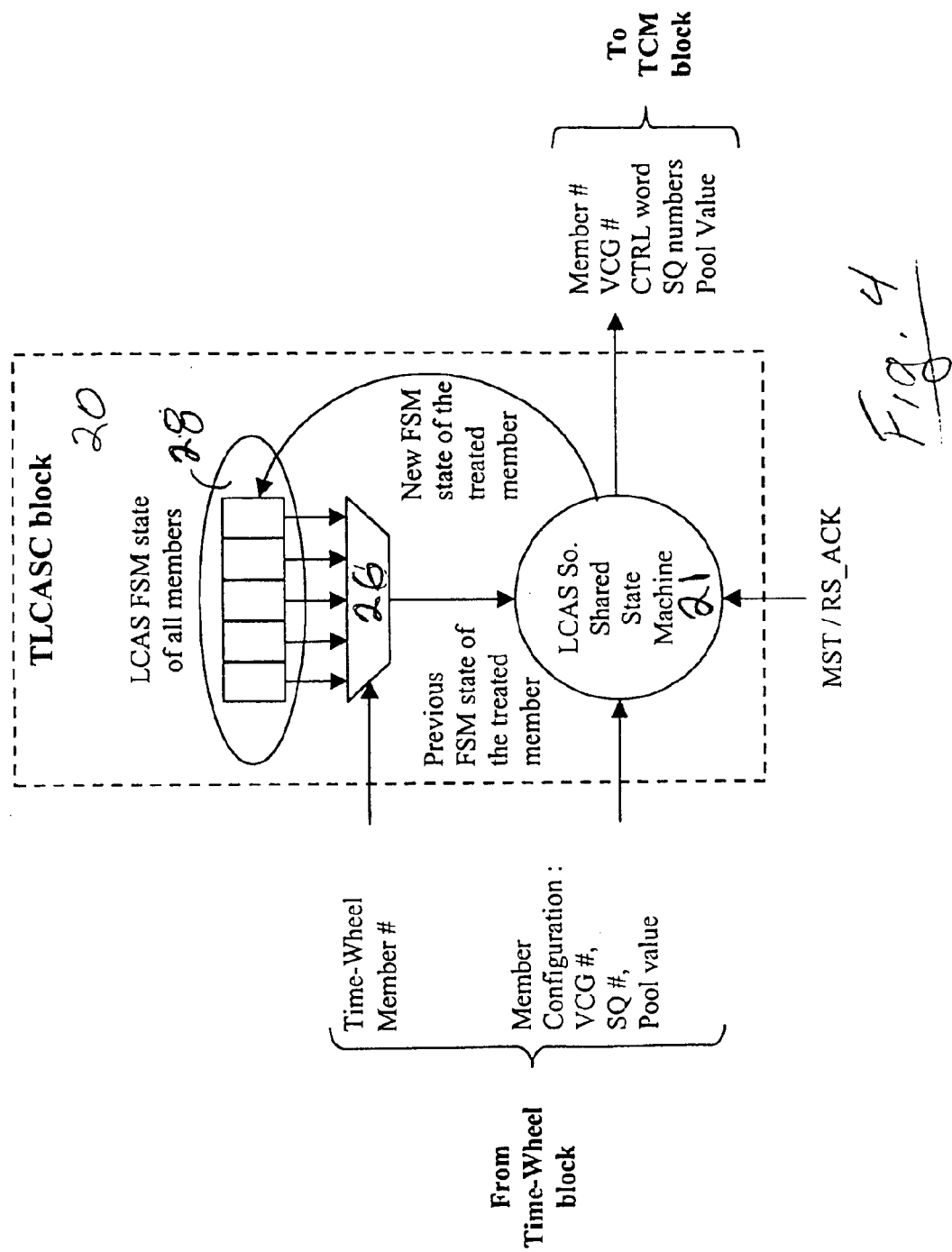
FIG. 4 is a high level schematic flow diagram illustrating operations of the LCAS processing block.

FIG. 4 illustrates the operations of the TLCASC block 20. In particular, as seen in FIG. 4, the TLCASC block 20 includes a multiplexer 26 and a set of registers 28 in addition to the shared FSM 21. The registers 28 store the previous state for each of the members and are selected by the multiplexer 26 in response to the time wheel (22 in FIG. 2). The FSM receives previous state information from the registers 28 via the multiplexer 26, receives the member configuration information from the NMS buffer (18 in FIG. 2) and receives the MST and RS_ACK signals as described above. With this information, the FSM generates an new state for the member (or possibly the same state if the member did not transition) which is stored in the appropriate location of the registers 28. The TLCAS provides Member#, VCG#, CTRL word, SQ numbers, Pool value and an enable bit to the TCM block (24 in FIG. 2).

The SQ numbers provided include the SQ number to be inserted in a control packet CP_SQ and the SQ number to be inserted in a payload transport PL_SQ. The reason for generating two different SQ values is that members in the DNU state do not carry payload. This causes "gaps" in the SQ value of members carrying payload. To make payload distribution easier, each member is also assigned an SQ for payload (PL_SQ). The new sequence generated contains no gaps.

LCAS and Non-LCAS members are treated differently by the TLCASC block. For non-LCAS members, all the settings made in the configuration registers (18 in FIG. 3) are output to the TCM block without any modification and the CTRL word is set to FIXED. LCAS members are treated differently. Using the NMS add and remove commands in association with MST bits for each LCAS member, the FSM decides if the state of the member needs to be changed (FSM transition) and generates a new CTRL, CP_SQ and PL_SQ value for the member if necessary.

Figure 5:
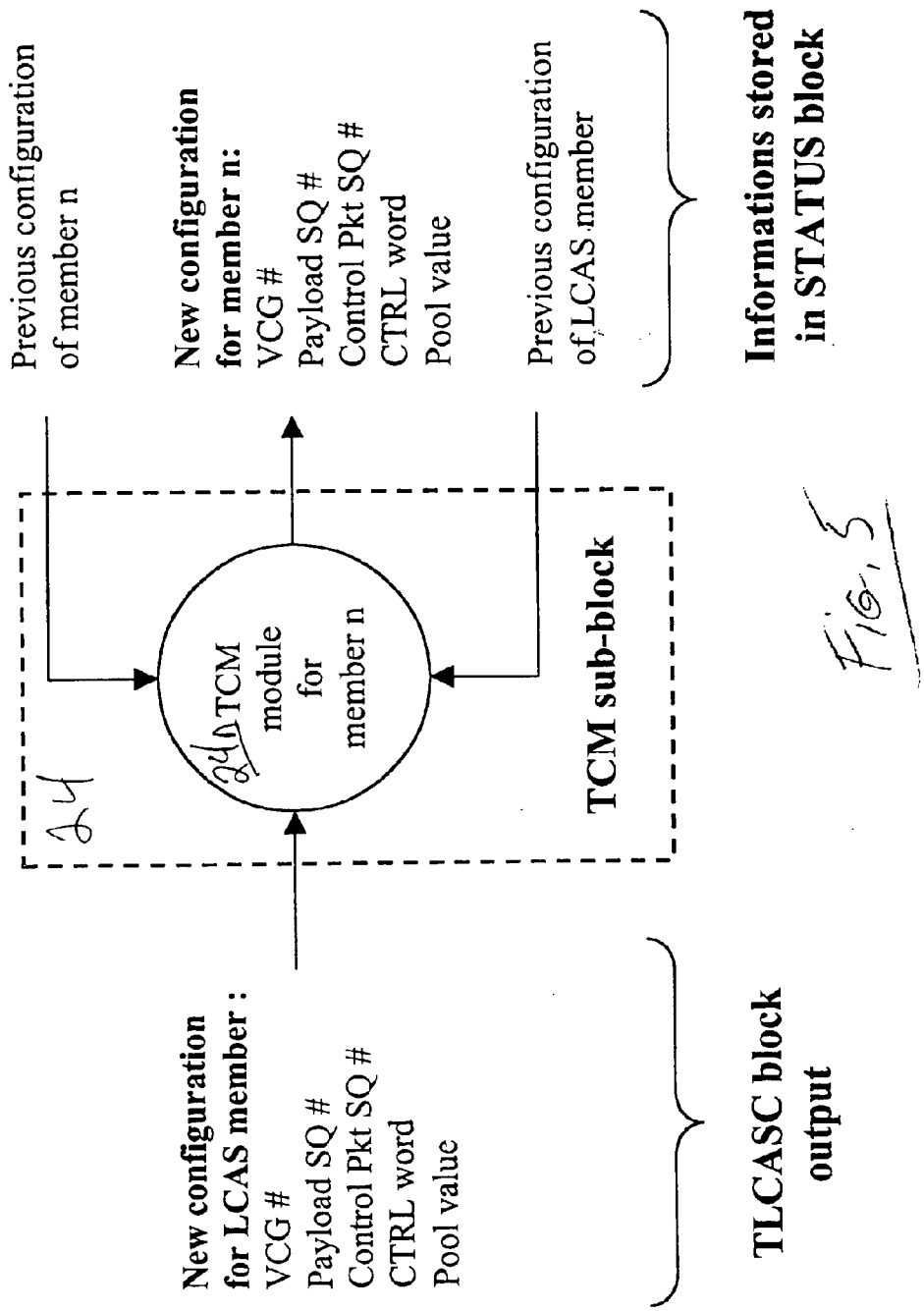
FIG. 5 is the TCM (transmit configuration management) sub-block.

FIG. 5 illustrates the functions of the TCM block (24 in FIG. 2) in greater detail. As mentioned above with reference to FIG. 2, the TCM block 24 has n modules, one for each possible VCG member. FIG. 5 illustrates the functionality of each module, e.g. the module 24n for member n. The module 24n receives the VCG#, CTRL word, SQ numbers and Pool value from the TLCASC block (20 in FIG. 4). In fact, all of the n number of TCM modules receive this information in parallel but only those affected by it (i.e. the member specified by the TLCASC ans well as any other member of the VCG which will be affected by this change) will act on the information. It also receives from the status block (14 in FIG. 2) the previous configuration for member n as well as the previous configuration of the member specified by the TLCASC. With this information, it generates new configuration information VCG#, CTRL word, SQ numbers and Pool value for member n (as well as for the other affected members) which is stored in the status block (14 in FIG. 2).

Figure 6:
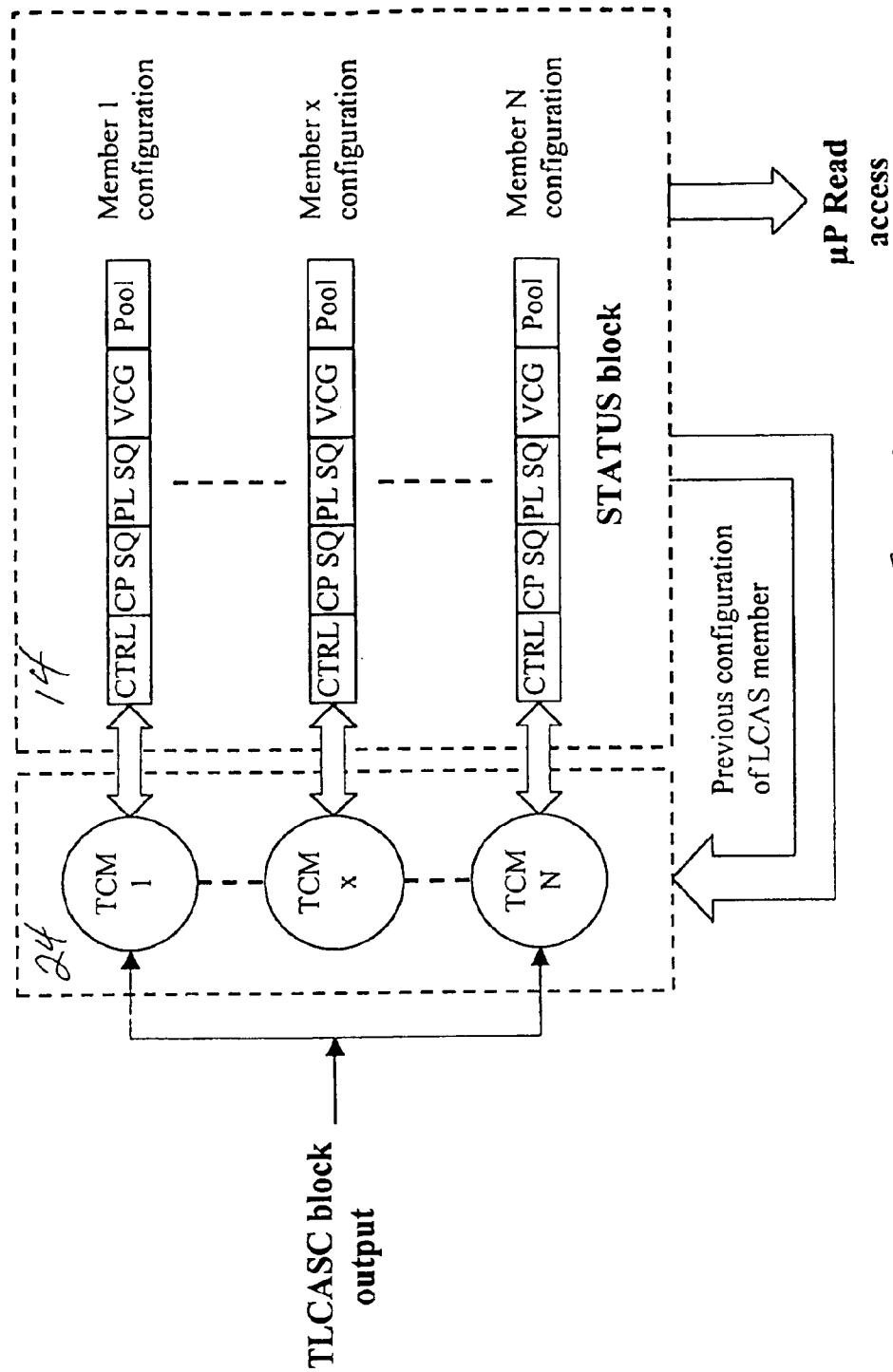
FIG. 6 is a high level schematic flow diagram illustrating the interface between the TCM block and the status registers.

FIG. 6 illustrates the relationship between the TCM block 24, the status block 14 and the microprocessor read access mentioned briefly in reference to FIG. 1. The result of each TCM sub-module is stored in registers that NMS can read in order to know the current configuration of each member. By reading the status of each member, it is easy to know which members are provisioned to be part of a VCG, as well as the CTRL word and SQ number for each member. The status block registers provide a way for the NMS to monitor the LCAS changes on the respective members. It can check/verify that results of the previous submitted add/remove command. The NMS is not responsible for the reconfiguration when members are added/removed but rather for only providing the add/remove commands per VCG.

Figure 7:
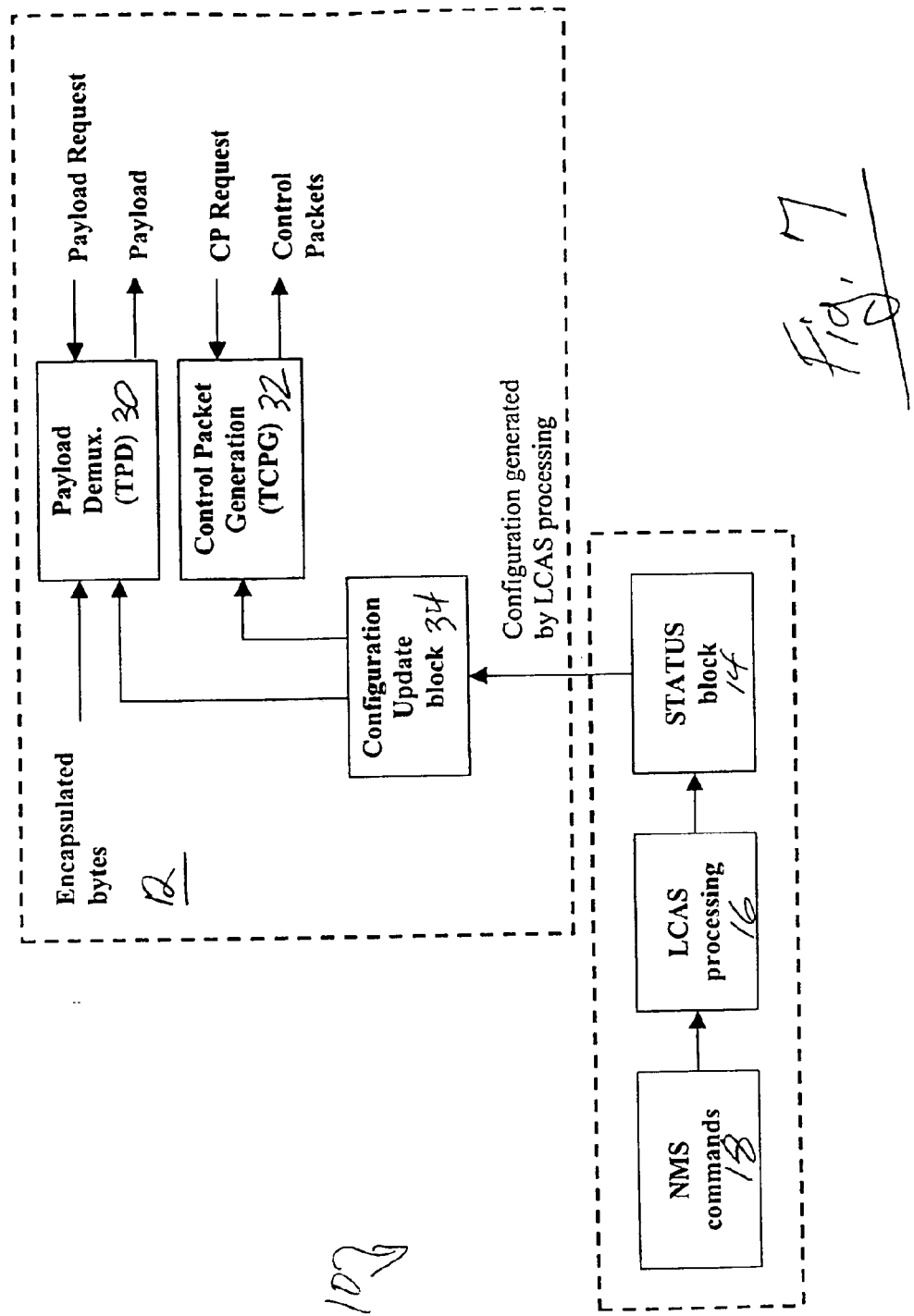
FIG. 7 is a high level schematic diagram illustrating the operations of the virtual concatenation.

The last block of the apparatus 10 in FIG. 1 is the virtual concatenation block 12. Further details of this block are illustrated in FIG. 7.

In order to perform virtual concatenation over SONET/SDH, two main processes are performed: demultiplexing of contiguous bytes of payload on each member, and generating control packet information for each member. The standards describe what needs to be done but not how to do it.

Figure 8:
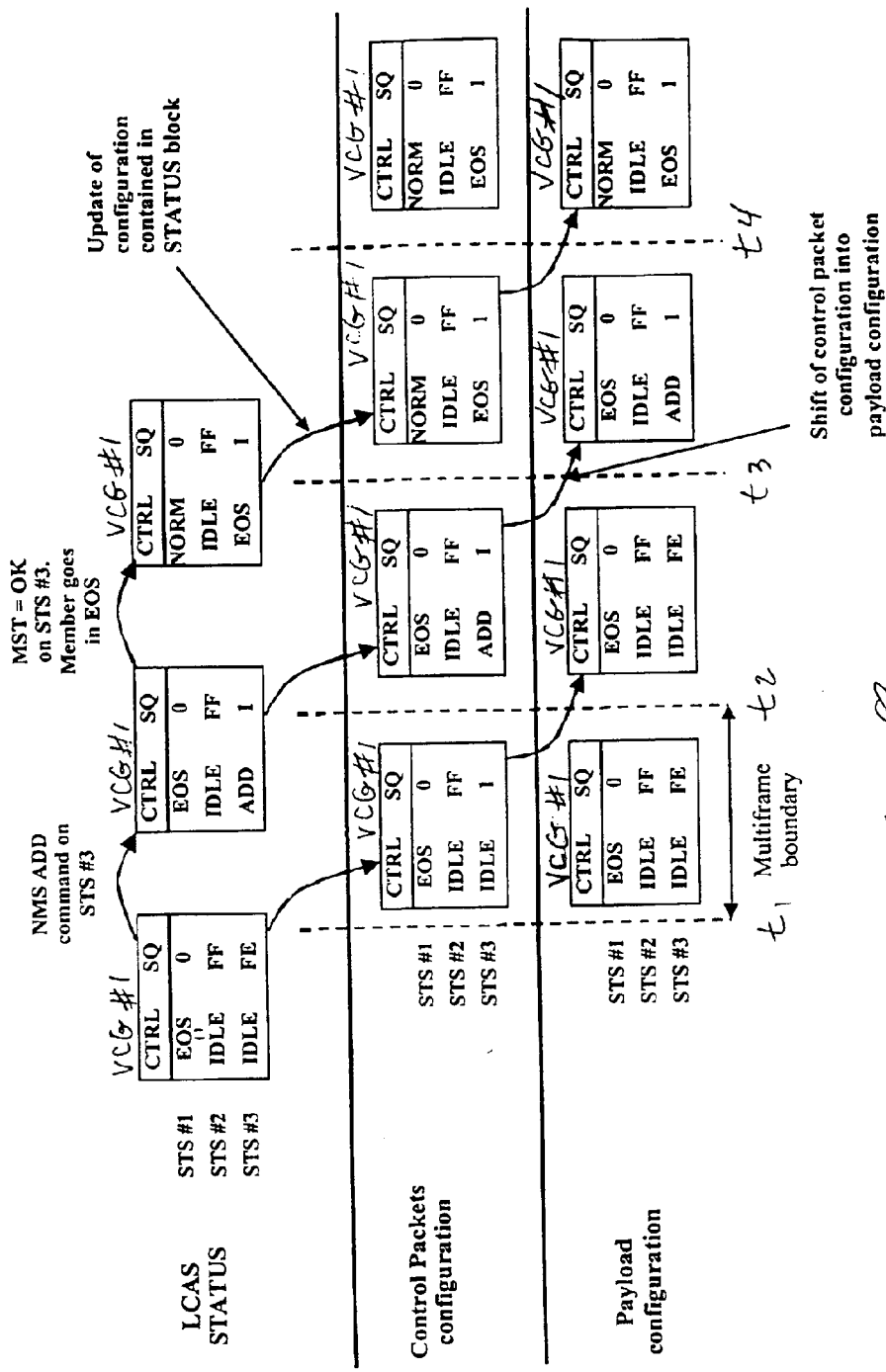
FIG. 8 is a schematic timing diagram illustrating the NMS ADD command in a VCG comprising two STS-1 signals.

According to the presently preferred embodiment of the invention, these two functions are performed in two different blocks: the Transmit Payload Demultiplexing (TPD) block 30 and the Transmit Control Packet Generation (TCPG) block 32. In order to implement LCAS, these blocks have to be able to work with a dynamic members allocation. In order to provide that functionality, the present invention utilizes a third block, the configuration update block 34. As illustrated in FIG. 7, the configuration update block 34 receives input from the status block 14 and provides output to the TPD block 30 and the TCPG block 32. FIG. 8 illustrates the timing for this transaction.

Member allocation in LCAS can only be updated at transition between two multiframes. This means that the configuration produced by LCAS processing 16 stored in status block 14 cannot be used directly but has to be updated at a precise time. The mapper (not shown) gives time reference for the multiframe boundaries.

The member allocation update process is performed independently for each VCG by a finite state machine in the configuration update block 34 that is responsible for extracting the new configuration information from LCAS STATUS registers.

Control packets sent by TCPG block 32 contain the configuration that will be used for payload transport during the next multiframe. This means that two different configurations have to be maintained, one for TCPG block 32, and the other for TPD block 30, delayed by a multiframe duration.

It will be recalled that the content of the configuration for each member is VCG #, CP_SQ, PL_SQ, CTRL, Pool value of that member. The two configurations provided by the configuration update block 34 from the data in the status block 14 are illustrated in FIG. 8.

Turning now to FIG. 8, starting in the upper left prior to time t1, the configuration in the status block (14 in FIG. 7) for a high order VCG shows three members STS#1, STS#2, and STS#3. At the time prior to t1, STS#1 has sequence number 0 and is the only member of the VCG which has been provisioned (i.e. carrying payload) as indicated by the control word EOS. STS#2 and STS#3 are idle and show their last sequence number assigned by the TLCASC. At time t1, the NMS issues an ADD command to add STS#3 to this VCG. However, that command cannot be implemented until t2. Thus, between time t1 and t2, the configuration in the control packets and the payload are the same as the last configuration in the status block.

At some point following t1 but before t2, the configuration in the status block shows the ADD control word for STS#3.

Following t2 and before t3, the configuration from the status register is carried in the control packets. The payload configuration remains the same during t2 to t3. During this time, the configuration in the status register changes to reflect the new VCG configuration where STS#1 is the first member having control word NORM and SQ#0 and STS#3 is the second and last member having control word EOS and SQ#1.

Following t3 but before t4, the ADD configuration is shifted into the payload configuration and the NORM configuration is shifted into the control packet configuration. It is not until after t4, however, that the NORM configuration is shifted into the payload configuration.

Turning back to FIG. 7, the control packet generator 32 provides a control packet for each member of a VCG. These control packets are inserted into the SONET/SDH frame by the mapper. Each control packet includes:

Frame Count/MFI-2 value, common to all the members of the same VCG,

Sequence Indicator of the concerned member (CP_SQ),

Control word (CTRL) of the concerned member,

Group Identification bit (GID), common to all members of the same VCG,

Member Status bits (MST), common to all members of the same VCG,

Resequence Acknowledge bit (RS_ACK), common to all members of the same VCG, and

A CRC field to protect the content of the control packet.

For Non-LCAS members, all fields of the control packet are set at '0', excepted Frame Count (MFI-2 for HO) and Sequence Indicator.

The payload demultiplexer 30 provides the mapper with a byte of payload at each request made by the mapper. The update block 34 provides a PL_SQ number for each VCG member which gives the position of the byte of payload within the members carrying payload for the VCG. Members carrying NORM, EOS and FIXED (for Non-LCAS mode) control words are the only ones that will transport payload.

Bytes of payload are read by the TPD 30 from the encapsulation block, stored at consecutive addresses, and then reordered and read using the PL_SQ value. This is why it is important not to have gaps in SQ values.

According to the presently preferred embodiment of the invention on-chip registers are used for storage of configuration information. It will be appreciated that on-chip RAM could also be used. In any case, it is preferred that this information be stored on-chip.

There have been described and illustrated herein methods and apparatus for the hardware implementation of virtual concatenation and link capacity adjustment over SONET/SDH frames. While particular embodiments of the invention have been described, it is not intended that the invention be limited thereto, as it is intended that the invention be as broad in scope as the art will allow and that the specification be read likewise. Thus, for example, while a system utilizing a single state machine was described, it will be appreciated that the system could use more than one state machine provided that at least on state machine is shared by a plurality of members. It will therefore be appreciated by those skilled in the art that yet other modifications could be made to the provided invention without deviating from its spirit and scope as so claimed.

What is claimed is:

1. A method for providing link capacity adjustment scheme (LCAS) for a virtual concatenation group (VCG) over SONET/SDH frames, comprising:
   a) providing an LCAS finite state machine on a chip with a SONET/SDH mapper;
   b) providing sharing means on the chip coupled to said state machine whereby a plurality of members of the VCG share the same state machine;
   c) maintaining a plurality of registers, one for each member for storing the last state of each member; and
   d) providing a status register for maintaining the present status of each member.

2. The method according to claim 1, wherein:
the sharing means includes a time wheel.

3. The method according to claim 2, wherein:
said time wheel generates AU3, TUG2, and TU2 indices.

4. The method according to claim 1, further comprising:
   e) providing a configuration register for maintaining the present configuration register for maintaining the present configuration of each member.

5. The method according to claim 1, further comprising:
   e) updating the status register with the state machine based on the last state of a member and network management commands.

6. The method according to claim 1, wherein:
the plurality of members of the VCG comprises all members of the VCG.

7. The method according to claim 6, wherein:
said step of providing a state machine comprises providing exactly one state machine.

8. The method according to claim 1, wherein:
said plurality of registers and said status register are provided on the same chip as the state machine, the mapper, and the sharing means.

9. The method according to claim 1, wherein:
the status register indicates whether the status of each member is "fixed", "add", "norm", "eos", "idle", or "do not use".

10. The method according to claim 4, wherein: the configuration register indicates for each member "SQ", "VCG", and "Pool".

11. An apparatus for providing link capacity adjustment scheme (LCAS) for a virtual concatenation group (VCG) over SONET/SDH frames, comprising:
   a) an LCAS finite state machine on a chip;
   b) sharing means on said chip coupled to said state machine whereby a plurality of members of a VCG share the same state machine;
   c) a plurality of registers on said chip coupled to said sharing means, one register for each member for storing the last state of each member; and
   d) a status register on said chip coupled to said sharing means for maintaining the present status of each member.

12. The apparatus according to claim 11, wherein:
said sharing means includes a time wheel.

13. The apparatus according to claim 12, wherein:
said time wheel generates AU3, TUG2, and TU2 indices.

14. The apparatus according to claim 12, further comprising:
   e) a configuration register coupled to said state machine for maintaining the present configuration of each member.

15. The apparatus according to claim 11, wherein:
said status register is updated by the state machine based on the last state of a member and network management commands.

16. The apparatus according to claim 11, wherein:
the plurality of members of the VCG comprises all members of the VCG.

17. The apparatus according to claim 11, further comprising:
   e) a SONET/SDH mapper coupled to said state machine, wherein
   said mapper and said state machine are on the same chip.

18. The apparatus according to claim 11, wherein:
said status register indicates whether the status of each member is "fixed", "add", "norm", "eos", "idle", or "do not use".

19. The apparatus according to claim 14, further comprising wherein:
said configuration resister indicates for each member "SQ", "VCG", and "Pool".

20. The apparatus according to claim 19, further comprising wherein:
"Pool" includes an indication of one of "Global", "Non-LCAS", "LCAS-Idle", and "LCAS-Add".

21. An apparatus for providing link capacity adjustment scheme (LCAS) for a virtual concatenation group (VCG) over SONET/SDH frames, comprising:

a) an LCAS finite state machine on a chip;

b) sharing circuitry on said chip coupled to said state machine whereby a plurality of members of a VCG share the same state machine;

c) a plurality of registers on said chip coupled to said sharing circuitry, one register for each member for storing the last state of each member; and d) a status register on said chip coupled to said sharing circuitry for maintaining the present status of each member.

22. The apparatus according to claim 21, wherein:

said sharing circuitry includes a time wheel.

23. The apparatus according to claim 22, wherein:

said time wheel generates AU3, TUG2, and TU2 indices.

24. The apparatus according to claim 23, further comprising:

d) a configuration register coupled to said state machine for maintaining the present configuration of each member.

25. The apparatus according to claim 21, wherein:

said status register is updated by the state machine based on the last state of a member and network management commands.

26. The apparatus according to claim 21, wherein:

the plurality of members of the VCG comprises all members of the VCG.

27. The apparatus according to claim 21, further comprising:

e) a SONET/SDH mapper coupled to said state machine, wherein said mapper and said state machine are on the same chip.

28. The apparatus according to claim 21, wherein:

said status register indicates whether the status of each member is "fixed", "add", "norm", "eos", "idle", or "do not use".

29. The apparatus according to claim 24, wherein:

said configuration register indicates for each member "SQ", "VCG", and "Pool".

30. The apparatus according to claim 29, wherein:

"Pool" includes an indication of one of "Global", "Non-LCAS", "LCAS-Idle", and "LCAS-Add".

* * * * *